(12) United States Patent
Sandoval et al.

(10) Patent No.: US 8,255,931 B2
(45) Date of Patent: Aug. 28, 2012

(54) METHOD FOR IMPLEMENTING EJECTION-SAFE API INTERCEPTION

(75) Inventors: Andrew L. Sandoval, Leander, TX (US); Yariv Kaplan, Austin, TX (US); Jose Flores, Austin, TX (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1228 days.

(21) Appl. No.: 12/029,402

(22) Filed: Feb. 11, 2008

(65) Prior Publication Data

US 2009/0204980 A1 Aug. 13, 2009

(51) Int. Cl.
*G06F 9/46* (2006.01)
*G06F 9/44* (2006.01)

(52) U.S. Cl. ........................................ 719/328; 717/162

(58) Field of Classification Search ........................ None
See application file for complete search history.

(56) References Cited

U.S. PATENT DOCUMENTS

| | | | |
|---|---|---|---|
| 7,055,146 B1* | 5/2006 | Durr et al. ................... | 717/162 |
| 2004/0250189 A1* | 12/2004 | Smith et al. ................... | 714/741 |
| 2006/0277539 A1* | 12/2006 | Amarasinghe et al. ....... | 717/168 |
| 2007/0214461 A1* | 9/2007 | Glatron et al. ................ | 719/321 |
| 2008/0016314 A1* | 1/2008 | Li et al. ........................ | 711/200 |

* cited by examiner

*Primary Examiner* — Andy Ho
*Assistant Examiner* — Abdou Seye
(74) *Attorney, Agent, or Firm* — Tarek N. Fahmi, APC

(57) ABSTRACT

A DLL that includes an API hook is injected into the address space of a target computer process called by an application program. Upon termination of the application program, computer-readable instructions describing a process for filtering exceptions returned from the target computer process are stored in memory locations accessible to the target computer process and the DLL is ejected from the address space.

3 Claims, 3 Drawing Sheets

```
void TargetAPI ( )
{
        printf("Target API called\n") ;                                    18
} void HookFunction ()
{
        TargetAPI( ) ;
        *(char *)NULL = 0 ;  //This simulates an exception that occurs when a
                             //call to the target API returns to an unloaded DLL.   20 printf("We will never get here\n") ;
} int ExceptionFilter(unsigned int code, struct _EXCEPTION_POINTERS *ep)
{
        // Make sure to handle the correct exception code.
        if (code == EXCEPTION_ACCESS_VIOLATION)
        {
                // Did this exception happen where the hook DLL used to be?
                if (ep->ContextRecord->Eip >= g_HookDllStartAddress &&
                    ep->ContextRecord->Eip <= g_HookDllEndAddress)             24
                {
                        //If so, use the _except section to handle it
                        return EXCEPTION_EXECUTE_HANDLER;
                }                                                       28
        }

//Otherwise, let the calling application handle this exception.
        return EXCEPTION_CONTINUE_SEARCH;                                  26
} void HookStub ( )
{
        _try
        {
                HookFunction( ) ;
        }
        _except(ExceptionFilter(GetExceptionCode(), GetExceptionInformation()))   22
        {
                printf("Exception caught\n") ;
        }
} void main ( )
{
        HookStub( ) ;
}
```

FIG. 3

METHOD FOR IMPLEMENTING EJECTION-SAFE API INTERCEPTION

FIELD OF THE INVENTION

The present invention relates to methods for ejecting (e.g., unloading) dynamic link libraries (DLLs) containing one or more computer program execution stream modifications (e.g., application programming interface (API) hooks) from a computer system without causing a target application of the hooks to crash.

BACKGROUND

Modern computer systems function under the control of an operating system—a set of computer-readable instructions that control low level functions within the computer system (for example, memory allocation, input and output distribution, interrupt processing and job scheduling). A well-known example of an operating system for personal computers is MICROSOFT'S WINDOWS™ family of operating systems. Although critical to the operation of the computer system, much (if not most) of the operating system's functioning is hidden from users of the computer system, who instead tend to interact with application programs to perform tasks such as composing documents or sending and receiving e-mail, etc.

Application programs are generally what a user thinks of when he or she thinks of a computer program. That is, a set of computer-readable instructions that allow the computer system to perform a specific task, such as word processing or the like. Application programs make use of operating systems to manipulate the resources of the computer system in desired ways to carry out these tasks. In doing so, the application program makes requests of the operating system functions through an application programming interface (API). When an application makes such a request, it is said to issue a "call" for the desired function.

The API defines how the application program must present its request (or call) for the desired service and the information (or "arguments") that must be provided to the operating system in order for the request to be carried out. Modern application programs include literally thousands of calls for things such as displaying characters on the screen of a computer system, and reading and writing information from/to the computer system's memory. When the requested function has been completed, the operating system returns control to the application program (and, in some cases, may also return a value for further processing by the application program).

Occasionally, it is desirable to change the manner in which a particular application program interacts with the operating system (or another target computer program of the application programs' requests), or to extend or monitor the behavior of the application program in some fashion. So-called "API hooking" is a programming technique that can be employed to carry out these tasks. So-called "hooks" are examples of computer program execution stream modifications that can be used to redirect a set of computer-readable instructions from its customary path (e.g., to a replacement function). This replacement function typically will perform some manipulation of the arguments passed as part of the call before transferring control back to the called API. Likewise, the replacement function can be used to manipulate results returned from the called API before passing them back to the application program. Thus, API hooking allows for monitoring and/or interception of calls for services made by an application program during its execution.

API hooks can be introduced in a variety of ways, either at the source of the call (i.e., the application program) or the target thereof (e.g., the operating system process being called). A particularly powerful method of API hooking involves injecting a dynamic link library (DLL) into the address space of the target program and patching the API with a branch (i.e., JMP) instruction. A DLL is a file containing executable instructions (in the form of subroutines and functions) that can be loaded and executed by a computer program while that program is running. The JMP instruction is simply a mechanism by which to transfer program control to a desired point in an instruction stream.

As shown in FIG. 1, when the above-described procedure is used, calls from an application program 10 to the intercepted API 12 are redirected by a hook stub 14 to a hook function 16 inside the injected DLL. The hook function 16 can then perform the desired manipulation (e.g., such as inspection or modification of arguments) before, after, and in some cases instead of passing control to the original API 12. The hook stub 14 is used is to prepare the stack frame (a portion of a call stack for the computer system—the call stack is used to keep track of the point to which each request for services should return when the request has been completed) and to keep a reference count of the number of concurrent threads (individual program flows) running inside the hook function 16.

This sort of API interception can be used with both on-demand software (software applications that are used on an as-needed basis but which are not installed on the subject computer system) and persistent software (software applications installed on the subject computer system), to control the behavior of application programs and provide additional context information concerning same. Nevertheless, a technical challenge is introduced when an on-demand application is terminated, or a persistent software application is uninstalled, and that application needs to clean up its DLLs from the subject computer system. The Windows operating system prevents an injected DLL (containing hook functions) from being deleted until it is ejected from the address space of all applications. But, hook functions such as those described above typically chain to the original APIs that can block execution for prolonged periods of time. Hence, as shown in FIG. 2, ejecting the DLL (and the associated hook function) from the address space of the target program would result in a crash (i.e., an exception) when the call returns back into the unloaded DLL code (a situation represented by the dashed lines).

In addition to the above, ejection of the "hooking DLL" may take place at an appointed time or when an application program that performed the initial injection of the subject DLL (a so-called controlling application) terminates. Or, there may be other scenarios that arise that lead to explicit ejection of the subject DLL or a self-ejection thereof. Hence, what is needed is a technique for safely ejecting a DLL containing one or more API hooks in such situations.

SUMMARY OF THE INVENTION

According to one embodiment of the present invention, in response to an exception returned from a called target computer process a determination is made as to whether or not the exception occurred within a memory space previously occupied by a DLL containing an API hook relating to the target computer process. If so, program control is passed to a designated exception handler. Otherwise, program control is returned to a calling application.

In other embodiments of the invention, responsive to termination of a software application that made one or more calls to a target computer process via an API, computer-readable instructions describing a process for filtering exceptions returned from the target computer process are stored in memory locations accessible to the target computer process. Thereafter, a DLL containing API hooks for one or more of the calls is ejected from an address space of a target computer process.

Still further embodiments of the present invention provide for injecting a DLL that includes an API hook into the address space of a target computer process called by an application program. Upon termination of a controlling application program responsible for injecting the DLL, storing computer-readable instructions describing a process for filtering exceptions returned from the target computer process in memory locations accessible to the target computer process and ejecting the DLL.

BRIEF DESCRIPTION OF THE DRAWINGS

The present invention is illustrated by way of example, and not limitation, in the figures of the accompanying drawings in which:

FIG. 3 is a portion of a computer program listing illustrating the use of an exception handler to manage a return from a called API when a DLL containing a hook function is ejected from the address space of the target application prior to such return;

DETAILED DESCRIPTION

Figure 1:
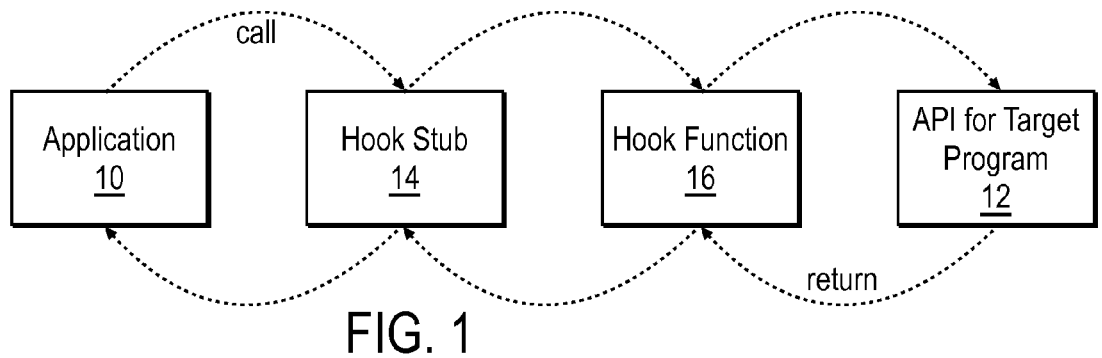
FIG. 1 illustrates an example of the flow between various software components of an API interception scheme.
Figure 2:
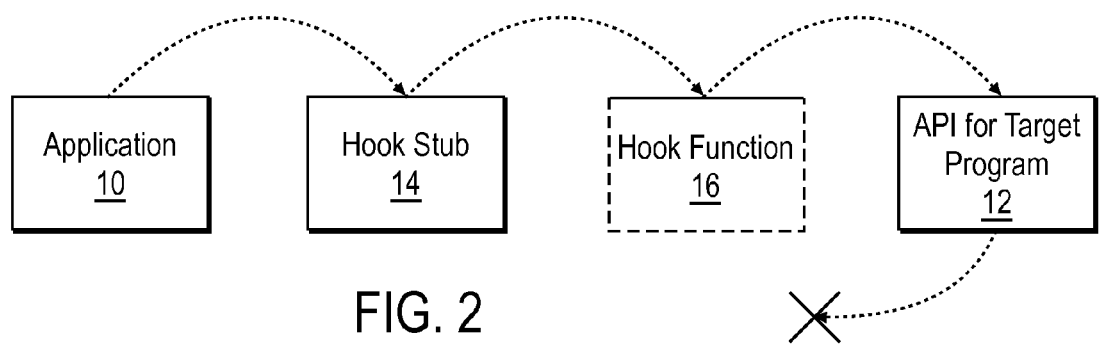
FIG. 2 illustrates a situation where a DLL containing a hook function is prematurely removed from the program flow illustrated in FIG. 1, which can lead to an exception condition for the target program.

Described herein are methods for safely ejecting DLLs containing API hooks from a computer system when an application program is terminated or uninstalled, without causing a target application of the hooks to crash. In general, terms such as software, programs, routines, applications, scripts and the like, as used herein, are meant to encompass any series of logical steps (described in a computer-readable language) performed in a sequence to accomplish a given purpose. Although these methods will be described with reference to various illustrated embodiments thereof, readers should recognize that these illustrated embodiments are merely examples of the present invention. Hence, these examples should not be read as limiting the scope of the invention, which instead should be measured only in terms of the claims following this description.

Several methods are available for managing the problems discussed above. For example, one may simply to leave the DLL injected even after the on-demand software is terminated. The downside of this approach is that it is impossible to delete the DLL while it is still loaded into the address space of running processes, which conflicts with the requirement of an on-demand application to leave no traces behind when it is terminated. This approach also creates complications when the on-demand software is again downloaded to the subject computer system, as it prevents overwriting the injected DLL with a newer version thereof.

A second approach is to modify the hook function to chain to the original API code by jumping into that code (rather than calling into it), leaving the stack frame exactly as it was when the hook function was entered. This allows the API to return directly to the original calling application program, skipping the injected DLL altogether. Since the DLL is no longer in use, it can be safely ejected and deleted from the subject computer system without creating a risk of an application crash. While this approach is viable in some cases, it is not suitable for situations where the hook function needs to examine the value of parameters returned by the original API.

A third solution is to terminate the injected application, allowing for proper cleanup of the injected DLL. This creates a usability problem and is not viable for system services that must remain running (or the Windows desktop process).

A forth solution allows safe ejection without compromising on-demand functionality or usability. This solution takes advantage of an operating system's structured exception handling (SEH) mechanism, which allow an application to recover from critical failures and resume execution from a "good" location. As part of this process, the compiler along with the operating system unwind the stack and call the destructors for any C++ objects that were constructed prior to the exception being triggered. FIG. 3 presents a portion of a computer program that illustrates the use of SEH in accordance with an embodiment of the present invention. Of course, other exception handling mechanisms may be used; for example, vectored exception handling may be used with the Windows operating system.

Figure 4:
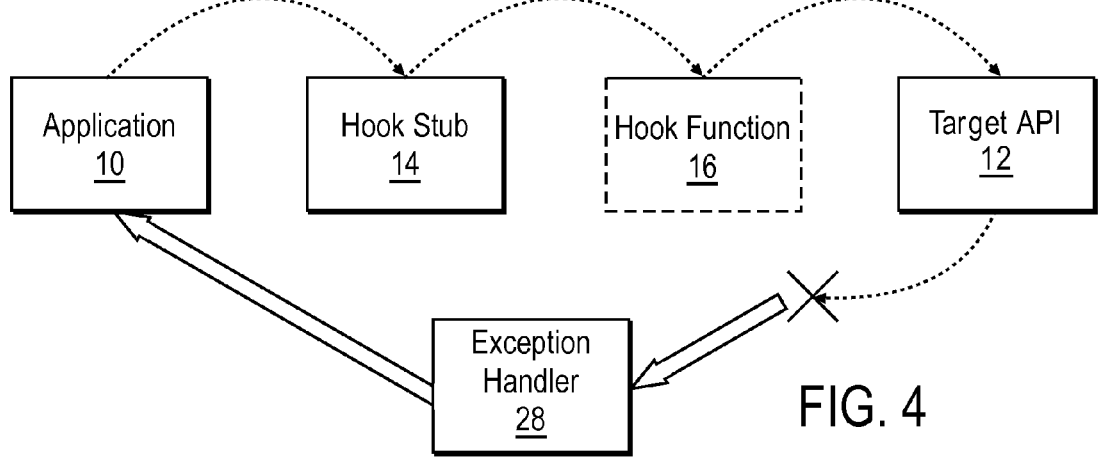
FIG. 4 is a program flow diagram illustrates the use of an exception handler as a means for managing a return from a called API when a DLL containing a hook function is ejected from the address space of the target application prior to such return.

The computer process (18) presented in FIG. 3 simulates the flow of execution when a call to an intercepted API is issued by an application. When the call to the target API returns back to the hook function, an exception is thrown (20) to simulate a case where a DLL containing the hook function is unloaded from the target application's address space. The end result is that instead of crashing (as would have been the case if the try/except statement (22) was omitted), the application resumes execution correctly as shown in FIG. 4.

The exception filter (24) checks to see whether the exception occurred inside the memory addresses previously occupied by the hook DLL and, if so, passes control to the except section for handling. Otherwise, the exception originated from within the target API and the calling application is given the chance to handle it (26).

As part of this solution, to avoid a second exception when the CPU passes control to the exception handler (28) and filter (26), those components will not be freed when the DLL is ejected. Instead, the exception handler and filter will be stored in a named virtual memory block that will be reused the next time hooks are set in the subject process. This is not a significant concern, inasmuch as the exception handler and filter consume only a small amount of virtual memory in each process' address space.

Figure 5:
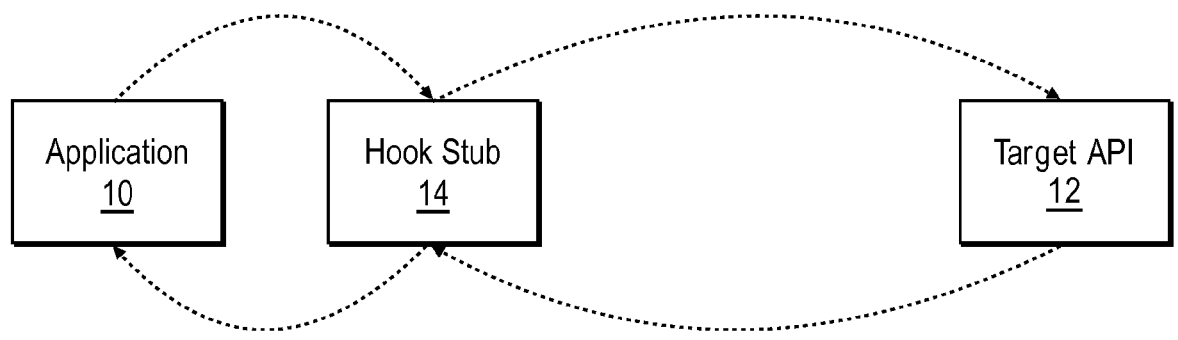
FIG. 5 shows the result of the program flow after the subject DLL has been safely ejected.

FIG. 5 shows the result after the subject DLL has been safely ejected. Calls are made into the target API 12 and returned therefrom. Note that although not shown in the diagrams it is important to ensure that prior to the ejection, the Hook Function 16 is not executing at the time. Similarly, there should be no ejection if Hook Stub 14 is about to call the Hook Function 16. Further, if the Hook Function 16 is to perform any post-processing or clean up after a call returns from the target API 12, ejection should be postponed until that call returns.

Using this approach, a DLL containing hook functions can be safely ejected as soon as the on-demand software is terminated or the persistent software is uninstalled, even when execution is blocked inside intercepted API calls. Other implementation options exist (e.g., per-process last chance exception handlers, hooking the Windows exception dispatcher, running the process under a debugger process), but these are all variations on the procedure presented above. Thus, methods for safely ejecting DLLs containing API hooks from a computer system when an application program is terminated or uninstalled, without causing a target application of the hooks to crash have been described.

Readers should recognize that various embodiments of the computer processes described herein may be implemented in any of a variety of computer programming languages, for execution by any form of computer system. These processes can be instantiated as a computer program stored in or on any form of computer-readable storage medium, such as, but not limited to, any type of disk (including floppy disks, optical disks, and magnetic-optical disks), memory (including read-only memories and random access memories), magnetic or optical cards, or any other type of media suitable for storing such instructions. The present invention is not limited to use with Windows-based systems but may also be used with any operating system that supports structured exception handling (e.g., Mac OS X, Linux, etc.).

What is claimed is:

1. A computer-implemented method, comprising: determining, in response to an exception returned from a called target computer process, whether the exception occurred within a memory space previously occupied by a dynamic link library (DLL) containing one or more application programming interface hooks relating to the target computer process and, if so, passing control to a designated exception handler, otherwise, returning control to a calling application program.

2. A computer-implemented method, comprising:
   storing, in response to termination of a software application that made one or more calls to a target computer process via an application programming interface (API), computer-readable instructions describing a process for filtering exceptions returned from the target computer process in memory locations accessible to the target computer process; and
   ejecting a dynamic link library (DLL) containing API hooks for one or more of the calls from an address space of a target computer process.

3. A computer-implemented method, comprising:
   injecting, into address space of a target computer process called by an application program through an application programming interface (API), a dynamic link library (DLL) including an API hook; and
   storing, upon termination of a controlling application program responsible for injecting the DLL, computer-readable instructions describing a process for filtering exceptions returned from the target computer process in memory locations accessible to the target computer process and ejecting the DLL.

* * * * *